(12) United States Patent  
Poslowsky

(10) Patent No.: US 7,078,718 B2  
(45) Date of Patent: Jul. 18, 2006

(54) STEERING DEVICE USING OPTICAL SIGNAL TRANSMISSION

(75) Inventor: Georg Poslowsky, Lauffen (DE)

(73) Assignee: Valeo Schelter und Sensoren GmbH, Bietigheim-Bissingen (DE)

( * ) Notice: Subject to any disclaimer, the term of this patent is extended or adjusted under 35 U.S.C. 154(b) by 78 days.

(21) Appl. No.: 10/500,726

(22) PCT Filed: Jan. 3, 2003

(86) PCT No.: PCT/EP03/00024

§ 371 (c)(1),  
(2), (4) Date: Jul. 6, 2004

(87) PCT Pub. No.: WO03/070525

PCT Pub. Date: Aug. 28, 2003

(65) Prior Publication Data

US 2005/0104451 A1    May 19, 2005

(30) Foreign Application Priority Data

Feb. 20, 2002   (DE) .............................. 102 07 720

(51) Int. Cl.  
*G02B 27/00* (2006.01)

(52) U.S. Cl. ................... 250/551; 385/26; 307/10.1

(58) Field of Classification Search ............... 250/551, 250/229, 216; 307/10.1; 385/26

See application file for complete search history.

(56) References Cited

U.S. PATENT DOCUMENTS

| 4,045,667 | A | * | 8/1977 | Hanson ................... 250/226 |
| 4,456,903 | A | | 6/1984 | Kishi |
| 4,471,230 | A | | 9/1984 | Yamamoto |
| 4,672,214 | A | * | 6/1987 | Takahashi et al. ......... 250/551 |
| 4,988,973 | A | | 1/1991 | Inui |

FOREIGN PATENT DOCUMENTS

| DE | 195 28 693 | 2/1997 |
| DE | 196 43 451 | 8/1997 |
| DE | 198 32 256 | 4/1999 |
| DE | 199 39 502 | 3/2001 |
| EP | 0 543 483 | 5/1993 |

* cited by examiner

*Primary Examiner*—Thanh X. Luu  
(74) *Attorney, Agent, or Firm*—Paul Vincent

(57) ABSTRACT

The invention relates to a steering device, especially for vehicles, comprising a rotatable steering wheel and a base that cannot be rotated relative to the steering wheel, and means for transmitting data between the steering wheel and the base. The invention is especially characterized in that the means are configured in such a manner that they transmit the data in the form of light signals between the steering wheel and the base in a non-contact manner.

20 Claims, 2 Drawing Sheets

STEERING DEVICE USING OPTICAL SIGNAL TRANSMISSION

This application is the national stage of PCT/EP03/00024 filed on Jan. 03, 2003 and also claims Paris Convention priority of DE 102 07 720.7 filed on Feb. 20, 2002.

BACKGROUND OF THE INVENTION

The invention concerns a steering device, in particular for vehicles, comprising a rotatable steering wheel and a base part which does not rotate along with the steering wheel, wherein means are provided for transmitting data between the steering wheel and the base part. Conventional means for transmitting data between the steering wheel and the base part comprise flat spiral springs which are sometimes also called contact spirals. They connect switches, sensors or other electric or electronic components which are mounted on the steering wheel and which rotate along therewith to other electric or electronic components via electric lines or also to evaluation units which do not rotate along with the steering wheel. Towards this end, such a flat spiral spring usually comprises a plurality of neighboring, mutually insulating conductor paths. One end of the flat spiral spring is disposed on the rotatable steering wheel and the other end is disposed on the stationary base part and does not follow the rotational motion of the steering wheel. When the steering wheel is turned in one direction, the flat spiral spring is helically wound, and it is unwound in response to rotation in the other direction. The flat spiral spring is thereby designed and disposed in such a manner as to not influence the steering behavior of the steering wheel. A disadvantage of such flat spiral springs is that they produce noise during steering and have unfavorably electromagnetic properties (EMV problems). A further disadvantage is that the mechanical contacts of the switches and/or buttons used in the steering wheel are subjected to wear.

It is therefore the underlying purpose of the present invention to further develop the above-described steering device such that it works without noise while eliminating wear.

SUMMARY OF THE INVENTION

This object is achieved by designing the means to transmit data between the steering wheel and the base part in a contact-less manner using light signals. Since data is transmitted in a contact-less manner, mechanical contact is avoided, thereby eliminating wear. Moreover, the means for data transmission produce no noise when the steering wheel is turned.

The means for transmitting the data preferably comprise at least one light emitting unit and/or at least one light receiving unit. The light signals emitted by the light transmitting unit can thereby advantageously be transported via light guides and/or light fingers. Moreover, the light guides and/or light fingers can also deflect the light signals in a desired direction. The light guides and/or light fingers may thereby be produced from a flexible material.

In a preferred embodiment of the invention, at least one light emitting unit and at least one light receiving unit are disposed on the base part side, wherein the light signals are each optically transmitted from the light transmitting unit to the steering wheel and from the steering wheel to the light receiving unit in a contact-less manner. Towards this end, light switches and/or light buttons are disposed on the steering wheel, which can switch the light signals passing through the steering wheel. The light signals are consequently transmitted from the base part, which does not follow the rotation of the steering wheel, to the steering wheel in a contact-less manner, where they are influenced or interrupted by light switches or light buttons and optically transmitted in a contact-less manner from the rotatable steering wheel to the non-rotatable base part using appropriate light guides or light fingers. In an embodiment of this type, electric or electronic components in the steering wheel can be largely or completely avoided.

In a further preferred embodiment of the invention, one light transmitting unit is preferably provided, wherein the light signals of the light transmitting unit are fanned-out in the steering wheel and the fanned-out light signals pass through light switches and/or light buttons. This is advantageous in that only one light transmitting unit must be provided, with the fanning-out of the light signals nevertheless permitting operation of a plurality of light switches and/or light buttons.

In a further preferred embodiment of the invention, the light signals are encoded. With such encoding, correspondingly encoded light signals are associated with corresponding light switches and/or light buttons. This is advantageous in that the number of the receiving units may be kept low even for large numbers of light switches and/or light buttons. In the ideal case, only one receiving unit is provided to receive the correspondingly encoded light signals.

Encoding may be realized e.g. through spectral selection of the light signals. Such selection may occur, in particular, when the light signals are fanned-out. It is also feasible to pulse the light signals to effect encoding. Different frequency ranges of the pulsed light signals may be associated with different light switches and/or light buttons.

If the light signals are not encoded, the individual light switches and/or light buttons are optically connected to different light receiving units. Each light switch or light button may thereby be associated with a light receiving unit. The number of light receiving units can be reduced through corresponding encoding of the light signals.

In a further preferred embodiment of the invention, the light transmitting unit on the base part side transmits light signals in a contact-free manner into a light guide ring, which is disposed about the axis of rotation of the steering wheel on the steering wheel side, the light guide ring being optically connected to the light switches and/or light buttons. When the steering wheel is turned, the light guide ring is consequently guided past the light transmitting unit at a preferably constant separation. This ensures that the light transmitting unit transmits light signals into the light guide ring and thereby to the light switches and/or light buttons at all rotational positions. The optical connection between the light guide ring and light switches and/or light buttons is realized, in particular, through corresponding light fingers or light guides.

In accordance with the invention, at least one and preferably several light guide rings are disposed around the axis of rotation of the steering wheel on the steering wheel side, into which the signals from the light switches and/or light buttons are guided. When the light signals are encoded, one light guide ring may be sufficient to receive the signals from the light switches and/or light buttons. If no encoding is provided, each light switch or light button must, in principle, have its own light guide ring.

In accordance with the invention, the light guide ring(s) which follow(s) the rotational motion of the steering wheel, is/are fed or scanned in a contact-free manner by the light receiving units on the base part side. When the light signals are encoded, it may be sufficient to merely provide one light receiving unit on the base part side. If several light guide rings are used, one light receiving unit may be provided for each light guide ring.

The light guide rings may be fed or scanned by the light receiving unit either directly or indirectly, in particular, via light fingers. It is thereby important that scanning is ensured throughout the complete turning of the steering wheel.

The light guide rings may be disposed either next to each other along the axis of rotation or in one plane, concentrically about the axis of rotation. The preferably one light transmitting unit and the light receiving unit may be correspondingly disposed radially or axially next to the respective light guide rings.

To obtain compact construction in the region of the steering means, the light guide rings may be designed in accordance with the invention as part of a code disc of a steering angle measuring means which is rotationally coupled with the steering wheel.

In a further, also preferred embodiment of the invention, the light transmitting unit transmits light signals into a light guide ring, which is disposed about the axis of rotation of the steering wheel on the base part side, and which is scanned in a contact-free manner by the at least one light finger which is optically connected to the light switches and/or light buttons on the steering wheel side. In this embodiment, the light guide ring which is optically coupled to the light transmitting unit, is disposed on the base part side, i.e. it does not follow the rotational motion of the steering wheel. This light guide ring is scanned in a contact-free manner by a light finger which follows the rotational motion of the steering wheel. This is advantageous in that the number of the rotating components is reduced.

At least one and preferably several light fingers are advantageously provided on the steering wheel side to transmit the light signals from the light switches and/or light buttons in a contact-free manner to light guide rings disposed about the axis of rotation of the steering wheel. This is advantageous in that the light guide rings receiving the switched light signals are also disposed on the base part side to further reduce the number of rotating parts.

The light guide rings are preferably disposed in one plane, in concentric circles about the steering axis. They may be disposed on the base part or be integrated in the base part. The base part may thereby be formed, in particular, as a printed circuit board.

LEDs have proven to be particularly advantageous as light transmitting units. Photo transistors are preferably used as light receiving units. The LEDs and/or the photo transistors are thereby preferably directly or indirectly disposed on the base part, designed as a printed circuit board.

Further advantageous embodiments and details can be extracted from the following description which describes and explains the invention in more detail with reference to the embodiments shown in the drawing.

DESCRIPTION OF THE PREFERRED EMBODIMENT

Figure 1:
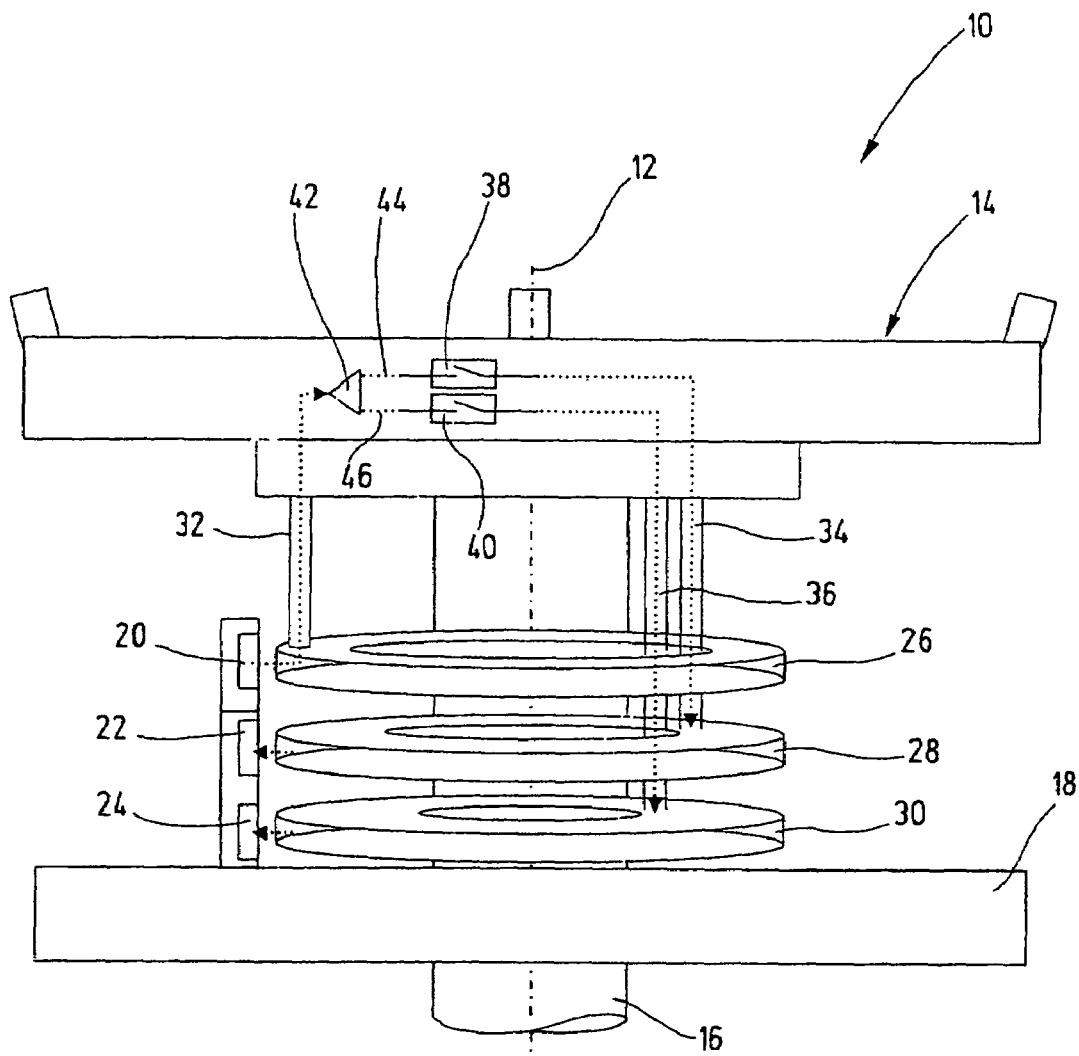
FIG. 1 shows a first inventive steering device in a partially perspective, side view.

The steering device 10 shown in FIG. 1 comprises a steering wheel 14 which is rotatably disposed about the steering axis 12 and is mounted to the free end of a connecting rod 16. The steering device 10 also comprises a base part 18 which is disposed on the vehicle side and does not follow the turning motion of the steering wheel 14. The steering device 10 also comprises means for transmitting data in the form of light signals between the steering wheel 14 and the base part 18. The means thereby comprise a light transmitting unit 20 on the base part side, two light receiving units 22 and 24 on the base part side, light guide rings 26, 28, 30 and light guides 32, 34, 36 on the steering wheel side. Light switches 28 and 39 are shown in the steering wheel 14 and can be actuated by the person operating the steering wheel 14.

Light signals (shown as dotted lines in the drawing) are transmitted in a contact-free manner into the light guide ring 26 on the steering wheel side via the light transmitting unit 20. The signals are guided from the light guide ring 26 via the light guide 32 to a fan-out unit 42 in which the light signals 32 are fanned-out into two light signal branches 44 and 46. The light signals are guided to the light switches 38 and 40 via the branches 44, 46. The light switches 38, 40 switch or influence the light signals. The light signals emanating from the light switches 38 are transmitted via the light guide 34 to the light guide ring 28. The light guide ring 28 is scanned by the receiving unit 22 in a contact-free fashion. The light signals leaving the light switch 40 are correspondingly fed via the light guide 36 to light guide ring 30 which is scanned by the light receiving unit 24 in a contact-free manner. A comparison of the transmitted light signals with the received light signals permits determination of whether or not one of the light switches 38, 40 has been actuated. Evaluation is effected via an evaluation unit (not shown).

In accordance with FIG. 1, the light guides 34 and 36, which are disposed coaxially to the steering axis 12, penetrate through the light guide ring 26. The light guide 36 which leads to the light guide ring 30 penetrates through the light guide ring 28. In FIG. 1, the light guide rings 26, 28, 30 are disposed at mutual separations. The light guide rings 26, 28, 30 can also directly border each other thereby preventing light transmission between the rings and permitting relative flat construction of the device.

Figure 2:
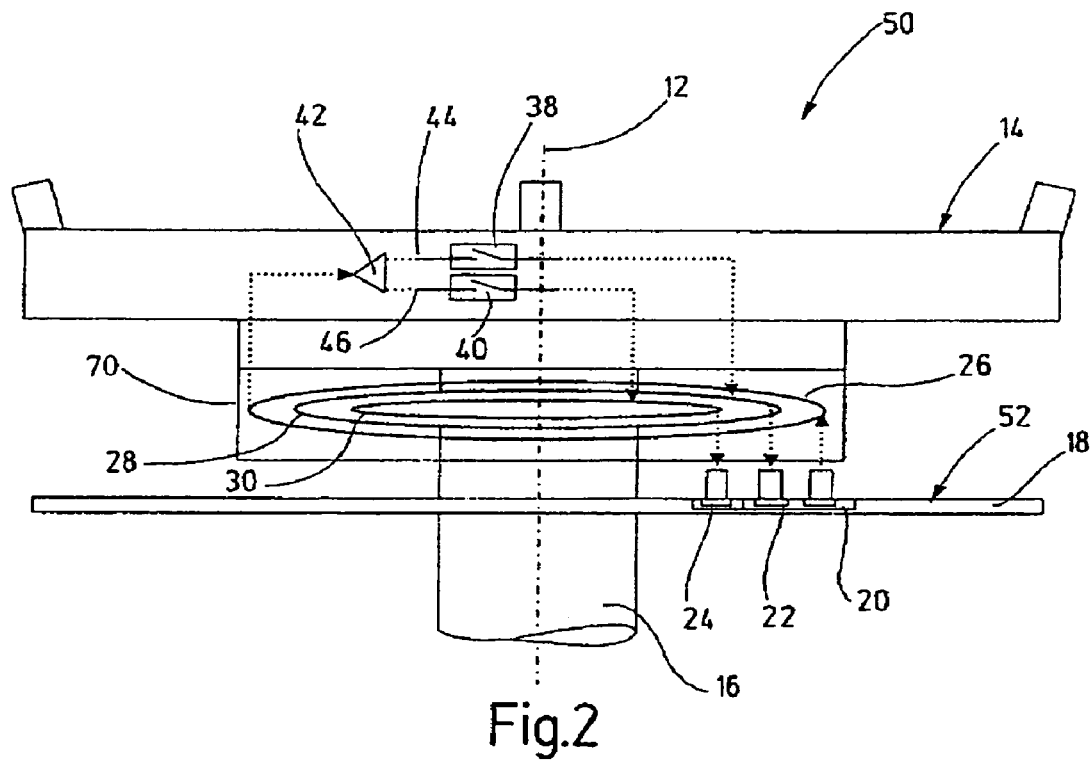
FIG. 2 shows a second inventive steering device.
Figure 3:
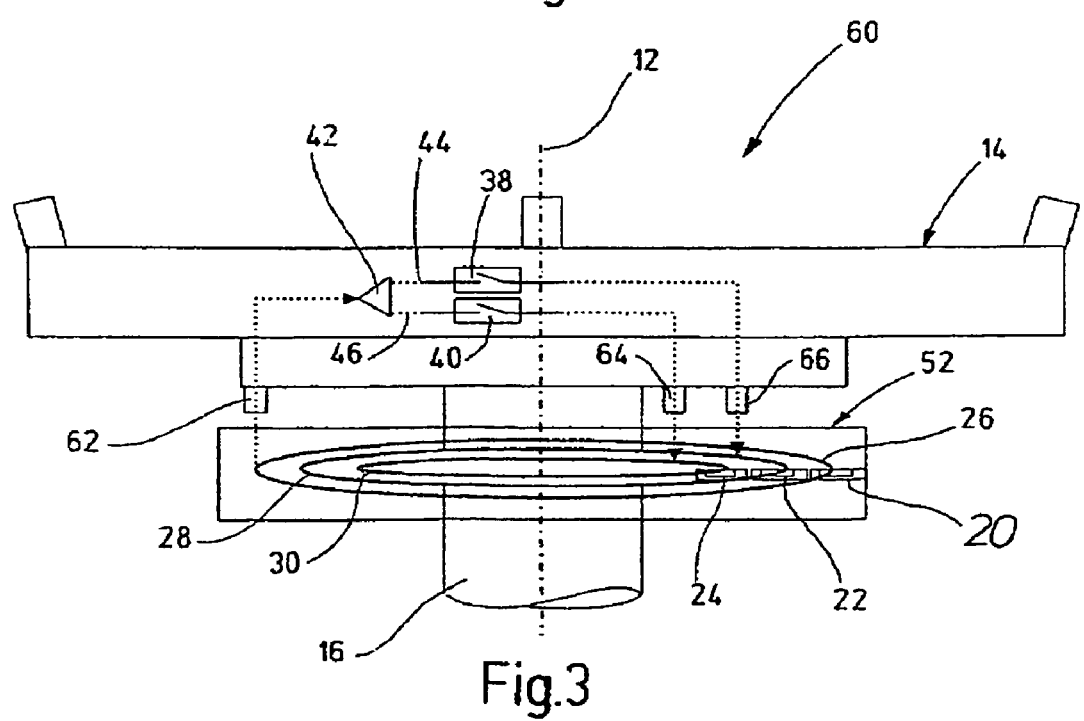
FIG. 3 shows a third inventive steering device.

FIG. 2 shows a second inventive steering device 50 and FIG. 3 shows a third inventive steering device 60. Parts of the steering devices 50 and 60 which correspond to parts of the steering device 10 have the same reference numerals.

The steering device 50 of FIG. 2 largely corresponds to the steering device 10 of FIG. 1. Also in this embodiment, the three light guide rings 26, 28, 30 are disposed on the steering wheel side. However, the light guide rings are disposed in one plane and are concentric about the steering axis 12. The transmitting unit 20 and the two receiving units 22, 24 are disposed next to each other on the base part 18, which is designed as printed circuit board 52 in the embodiment of FIG. 2. Further electric or electronic components may be provided on the printed circuit board 52 such as e.g. the evaluation unit for evaluating the received light signals. The light guide rings 26, 28, 30 may be Dart of a steering angle measuring means code disc 70, which is rotationally coupled to the steering wheel 14.

In contrast to the steering devices 10 and 50, the steering device 60 of FIG. 3 has light guide rings 26, 28, 30 which are not disposed on the steering wheel side but on the base part side.

The base part is thereby designed as a printed circuit board 52 in which the light guide rings 26, 28, 30 are integrated. The transmitting unit 20 and the receiving units 22, 24 are disposed on the printed circuit board 52. The steering wheel 14 has a total of three light fingers 62, 64, 66 for contact-free transmission of the light signals between the steering wheel 14 and printed circuit board 52, wherein the light finger 62 is oriented towards the light guide ring 26 as the steering wheel 14 is turned. The two light fingers 64 and 66 face the light guide rings 28 and 30.

The steering devices 10, 50, 60 shown in FIGS. 1–3 each have one light transmitter 20 and two light receivers 22, 24. Depending on the number of light switches 38, 40 provided, additional transmitting or receiving units may be provided. The number of light guide rings can be correspondingly increased.

In accordance with the invention, it is also feasible to transmit the light signals in an encoded form. Corresponding encoding can thereby be associated with a corresponding light switch. For encoding, the light signals may be e.g. selected in a pulsed or spectral manner. Encoding of the light signals has the advantage that a low number of light guide rings or light branches can supply a large number of light switches or light buttons.

All the features shown in the description, in the following claims and in the drawing may be essential to the invention either individually as well as in arbitrary combination.

I claim:

1. A steering device suitable for use in a vehicle, the steering device structured and dimensioned for operation by an individual, the steering device comprising:
   a support structure;
   a steering wheel borne for rotation with respect to said support structure;
   a base part mounted to said support structure and not rotating along with said steering wheel;
   at least one light transmitting unit mounted to said base part, said light transmitting unit emitting light signals;
   at least one light receiving unit mounted to said base part for detecting said light signals;
   light switches mounted to said steering wheel for activation by the operating individual to switch or influence said light signals; and
   means for passing, in a contact-free manner, said light signals from said transmitting unit to said light switches and for passing, in a contact-free manner, said light signals from said light switches to said light receiving unit, wherein said light transmitting unit transmits said light signals in a contact-free manner into at least one light guide ring disposed around an axis of rotation of said steering wheel on a steering wheel side, said light guide ring optically communicating with said light switches, wherein a plurality of light guide rings are substantially disposed in one single plane, concentrically about said axis of rotation.

2. The device of claim 1, wherein said passing means comprise light guides and/or light fingers.

3. The device of claim 1, wherein said passing means comprise means for fanning out said light signals of said light transmitting unit in said steering wheel, wherein fanned-out light signals pass said light switches.

4. The device of claim 1, wherein said light signals are encoded.

5. The device of claim 4, wherein said light signals are spectrally separated for encoding.

6. The device of claim 4, wherein said light signals are pulsed for encoding.

7. The device of claim 1, wherein said light switches are optically connected to different light receiving units.

8. The device of claim 1, wherein said at least one light guide ring, disposed about said axis of rotation of said steering wheel on said steering wheel side, accepts said light signals from said light switches.

9. The device of claim 1, wherein said at least one light guide ring is scanned in a contact-free manner by said light receiving unit at a base part side.

10. The device of claim 1, wherein feeding or scanning is at least one of direct, indirect, and using light fingers.

11. The device of claim 1, wherein a plurality of light guide rings are disposed next to each other along said axis of rotation.

12. The device of claim 1, wherein outer radii of a plurality of light guide rings are largely identical.

13. The device of claim 1, wherein said light transmitting unit and said light receiving unit are disposed radially or axially proximate to said light guide ring.

14. The device of claim 1, wherein said light transmitting unit transmits said light signals into said light guide ring disposed about said axis of rotation of said steering wheel from a base part side, said signals being processed in a contact-free manner by at least one light finger optically communicating with said light switch.

15. The device of claim 14, wherein at least one light finger is disposed on a steering wheel side to transmit said light signals in a contact-free manner from said light switch to said light guide ring disposed about said axis of rotation of said steering wheel on said base part side.

16. The device of claim 14, wherein a plurality of light guide rings are disposed on or in said base part.

17. The device of claim 1, wherein said at least one light transmitting unit comprises an LED or a photo transistor.

18. The device of claim 17, wherein said base part is a printed circuit board on which LEDs and/or photo transistors are directly or indirectly disposed.

19. A steering device suitable for use in a vehicle, the steering device structured and dimensioned for operation by an individual, the steering device comprising:
   a support structure;
   a steering wheel borne for rotation with respect to said support structure;
   a base part mounted to said support structure and not rotating along with said steering wheel;
   at least one light transmitting unit mounted to said base part, said light transmitting unit emitting light signals;
   at least one light receiving unit mounted to said base part for detecting said light signals;
   light switches mounted to said steering wheel for activation by the operating individual to switch or influence said light signals; and
   means for passing, in a contact-free manner, said light signals from said transmitting unit to said light switches and for passing, in a contact-free manner, said light signals from said light switches to said light receiving unit, wherein said light transmitting unit transmits said light signals in a contact-free manner into at least one light guide ring disposed around an axis of rotation of said steering wheel on a steering wheel side, said light guide ring optically communicating with said light switches, wherein said light guide ring is part of a steering angle measuring means code disc which is rotationally coupled with said steering wheel.

20. A steering device suitable for use in a vehicle, the steering device structured and dimensioned for operation by an individual, the steering device comprising:
   a support structure;
   a steering wheel borne for rotation with respect to said support structure;
   a base part mounted to said support structure and not rotating along with said steering wheel;
   at least one light transmitting unit mounted to said base part, said light transmitting unit emitting light signals;
   at least one light receiving unit mounted to said base part for detecting said light signals;
   light switches mounted to said steering wheel for activation by the operating individual to switch or influence said light signals; and
   means for passing, in a contact-free manner, said light signals from said transmitting unit to said light switches and for passing, in a contact-free manner, said light signals from said light switches to said light receiving unit, wherein said light transmitting unit transmits said light signals in a contact-free manner into at least one light guide ring disposed around an axis of rotation of said steering wheel on a steering wheel side, said light guide ring optically communicating with said light switches, wherein said light transmitting unit transmits said light signals into said light guide ring disposed about said axis of rotation of said steering wheel from a base part side, said signals being processed in a contact-free manner by at least one light finger optically communicating with said light switch, wherein a plurality of guide rings are substantially disposed in a single plane in concentric circles about said steering axis.

* * * * *